United States Patent [19]

Eibes, deceased et al.

[11] E Re. 28,907

[45] Reissued July 20, 1976

[54] SELF-TAPPING THREADED BUSHINGS

[76] Inventors: Carl B. H. Eibes, deceased, late of Schnalttenback, Germany; by Ursula Eibes, nee Waschau, and Christian Eibes, both of Dr. Carl-Eibes-Str. 11, Schnaittenback, Germany; Carl-Herwig Eibes, Grunewaldstra. 30, Berlin-Schoneberg, Germany; Maria-Theresia Wagner, nee Eibes, Hans Klopferweb Nr. 1, Amberg, Germany, all legal heirs

[22] Filed: July 3, 1975

[21] Appl. No.: 593,404

Related U.S. Patent Documents

Reissue of:

[64] Patent No.: 3,866,510
Issued: Feb. 18, 1975
Appl. No.: 329,952
Filed: Feb. 5, 1973

U.S. Applications:

[60] Continuation of Ser. No. 125,260, March 17, 1971, abandoned, which is a division of Ser. No. 733,562, May 13, 1968, Pat. No. 3,597,781.

[30] Foreign Application Priority Data

June 5, 1967 Germany ..... 62476

[52] U.S. Cl. ..... 85/47
[51] Int. Cl.[2] ..... F16B 25/00
[58] Field of Search ..... 85/47, 48

[56] References Cited

UNITED STATES PATENTS

| | | | |
|---|---|---|---|
| 2,347,360 | 4/1944 | Muenchinger | 85/47 |
| 3,209,383 | 10/1965 | Carlson | 85/47 |
| 3,451,080 | 6/1969 | McIntyre et al. | 85/47 |

FOREIGN PATENTS OR APPLICATIONS

| | | | |
|---|---|---|---|
| 843,129 | 8/1960 | Australia | 85/47 |

*Primary Examiner*—Roy D. Frazier
*Assistant Examiner*—Thomas J. Holko
*Attorney, Agent, or Firm*—Pollock, Vande Sane & Priddy

[57] ABSTRACT

The disclosure relates to a threaded bushing which, upon entering and turning in the initially smooth bore of the work piece, will form through its own male thread the corresponding internal thread within the wall of the work piece bore. The bushing is formed with one or more exterior bevels or grooves which extend axially over at least several threads and intersect such threads to form spoon or cup-shaped frontal areas where each bevel or groove merges into a respective thread.

3 Claims, 11 Drawing Figures

FIG. 1
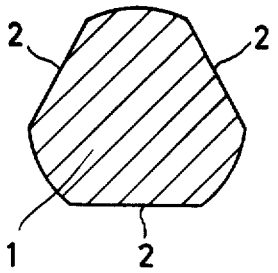
FIG. 2
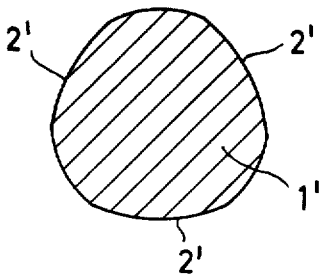
FIG. 3
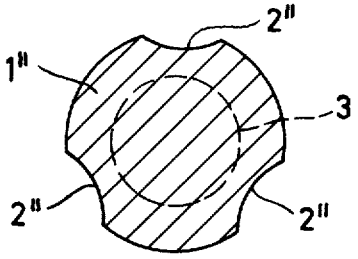
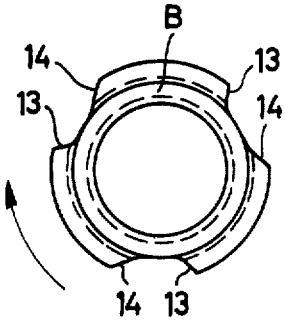
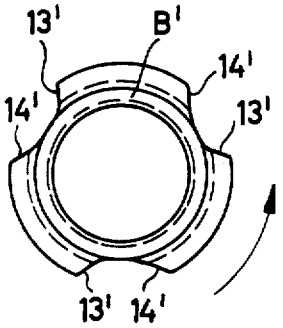
FIG. 4 FIG. 5
Carl B. H. Eibes, Deceased
by Ursula Eibes, geb. Waschau
Christian Eibes
Maria-Theresia, geb Eibes
Carl-Herwig Eibes, heirs
*INVENTOR.*
*BY*
Hall, Pallack & Vande Sande Carl B. H. Eibes, Deceased
by Ursula Eibes, geb. Waschau
Christian Eibes
Carl-Herwig Eibes
Maria-Theresia, geb.
Eibes, heirs

INVENTOR.

BY

Hall, Pallack + Vande Sande

Carl B. H. Eibes, Deceased
by Ursula Eibes, geb. Waschau
Christian Eibes
Carl-Herwig Eibes
Maria-Theresia, geb. Eibes, heirs
INVENTOR.

BY

Hall, Pallack & Vande Sande

Carl B.H. Eibes, Deceased
by Ursula Eibes, geb. Woschao
Christian Eibes
Carl-Herwig Eibes
Maria Theresia, geb.
Eibes, heirs
INVENTOR.

BY

Hall, Pallach + Vande Sande

Carl B.H. Fibes, Deceased
by Ursula Fibes, geb.
Christian Waschau
Carl-Herwig Fibes
Maria-Theresia
geb Fibes, heirs
INVENTOR.

BY

Hall, Pollard & Vande Sande

SELF-TAPPING THREADED BUSHINGS

Matter enclosed in heavy brackets [ ] appears in the original patent but forms no part of this reissue specification; matter printed in italics indicates the additions made by reissue.

This is a continuation of Ser. No. 125,260, filed Mar. 17, 1971, and now abandoned, which was a division of application Ser. No. 733,562, filed May 13, 1968, and now U.S. Pat. No. 3,597,781, issued Aug. 10, 1971.

BACKGROUND OF THE INVENTION

Threaded bushings possessing a self-tapping male thread are usually manufactured from metals, such as steel, bronze or brass, and serve to fasten screws, bolts or similar connecting elements within or to structural members or work pieces which have a lesser hardness than the bushing material and can consist for example of soft steel or iron, wood, plastic, light metals and the like. It is the purpose of such threaded bushings, also called liners, to create within a relatively soft work piece an internal thread possessing relatively great strength. This strength is attained not only by this thread of substantially greater diameter relative to the internal thread diameter of the bushing but also by avoidance of a severance of the fibers of the material, and it is one of the purposes of the invention to avoid this disadvantage.

The invention is designed to solve several problems:

1. The internal thread, produced within the bore of the work piece, is to be produced partially without cutting; for example, by notching, and partially by cutting, i.e., by metal removal;

2. The entering torque of the threaded bushing is to be kept relatively low, while the return torque or restoring moment should be relatively high;

3. The costs for manufacturing the threaded bushing should be as low as possible.

Self-tapping threaded bushings of various types and designs are known. For example, there exist threaded bushings which provide, at least over a portion of the length of the bushing, grooves or slots which run substantially parallel to its axis and which form cutting edges together with the webs of the thread, and with the outside of the penetrating end of the bushing usually designed conically. These slots or grooves of the known threaded bushings are usually produced, following the manufacture of the male thread of the bushing, by milling, grinding or the like. The method of manufacture is very costly. Furthermore, threaded bushings of this type will produce the internal thread within the bore of the work piece almost exclusively by cutting. The forming of the thread by cutting in the manner described has the disadvantage that the fibers of the work piece material are severed, thereby lowering its stability and especially its shearing strength.

SUMMARY OF THE INVENTION

In order to solve the above-described problems, the invention is based on a threaded bushing possessing bevels, grooves, or the like which intersect the male thread and form recesses within the originally round contour, and which extend axially at least over several threads but preferably over the total axial length of the threaded bushing, and whereby between the bevel, groove, or the like on the one hand and the threads on the other hand (i.e., at the crests of the thread) faces or frontal areas are created which will produce female threads within the bore of the work piece, the novel and inventive feature being that the frontal areas of each thread are bent or curved up, relative to the original contour, and are formed concavely, similar to a shovel or spoon.

Particularly significant in connection with the threaded bushing proposed by the invention is the point that the frontal areas of the thread, facing each other from both sides of a bevel, are bent or curved up at dissimilar magnitudes relative to the original contour, and that they are designed in the shape of a shovel or spoon.

Another specific characteristic, significant in connection with the invention, of these frontal areas is the fact that they possess edges which are designed in the form of not too sharply edged cutting edges, or edges which will help to increase the restoring moment. These frontal areas are produced by a male thread-rolling process and appropriate deformation of material; that is, they are formed by raising from the original surface or contour of the bevel or the like.

According to the invention, this is accomplished by furnishing a profile bar which has several axially extending bevels distributed around its contour (the bevels preferably being axially parallel), with a male thread by means of rolling tools, whereby the characteristics of the rolling process, such as rolling pressure, rolling depth, rolling advance, shape and material of the rolling tool, and the like, are set and selected in such manner that the frontal area, created in the zone of transition between an individual crest of the thread and an individual bevel, is curved at the thread end to a greater or lesser degree relative to the original plane or contour of the bevel, or is raised due to the deformation of material, and that the edges of said frontal areas project above the areas with the edges not too sharply edged. The not too sharply edged design is a decisive feature for the creation of a powerful restoring moment, but it leads also to the other desired effect, namely that upon entering and turning of the bushing the internal thread of the work piece is being formed only partially by cutting but mainly by deformation without cutting.

Preferred basic material to be utilized is profile material, for example bars or tubes, produced by drawing. Such profile material will already possess bevels in flat, convex or concave form.

The invention proposes further that during or after the rolling of the male thread, there are produced in a manner known per se, adjacent to one or both ends of the threaded bushing, conically beveled male thread profiles, their outer diameters tapering off toward the ends. By making the threaded bushing pointed at both ends, the invention makes it feasible to select one or the other of a threaded bushing to be entered and turned in the smooth bore of a work piece, or to fasten it within the work piece, utilizing the greater or lesser curved frontal area as cutting surface, or the lesser or greater curved frontal area as means to increase the restoring torque.

The direction of rolling at the creation of the male thread of the bushing and the direction of turning of the bushing into the work piece will either coincide or be opposite to each other, and accordingly the more heavily curved frontal area will act as thread-forming means, and the lesser curved frontal area as means to increase the restoring torque, or vice-versa.

The invention proposes further that the boring of the threaded bushing and the furnishing of the female thread is accomplished in a manner known per se either before or after the thread-rolling.

If applicable, it is further proposed that in case of a threaded bushing made of steel the male thread or the entire bushing is tempered after the thread-rolling.

It has been found that such concave or spoon-shaped designs of the frontal areas which are curved or drawn up relative to the bevel, groove, or the like possess edges which have, or can perform, at least partially, the function of cutting and also simultaneously of displacing material if these frontal areas are utilized as internal thread-generating means.

At each bevel, groove, or the like, each individual crest of a thread possesses two frontal areas, and according to the invention the second area formed in the direction of rolling has a lesser pitch than the frontal area designed for cutting, but even the latter is still kept sufficiently concave or spoon-shaped in order to attain a restoring torque which is greatly improved over the designs known heretofore. It is also possible, under special circumstances, to interchange the functions of the two frontal areas so that the flatter area will act as thread-forming means when entering and turning in the threaded bushing, with the more pronouncedly curved frontal area increasing the exit torque during return movement.

Manufacture is acccomplished by a process covered by the invention, preferably by thread-rolling. It was found unxpectedly and surprisingly that in case of basic material possessing the bevels or grooves at full length, and proper selection of the rolling surface pressure as well as the other characteristics of the rolling process, there are created by the thread-rolling curved frontal areas at the crests of the thread, that is within the zone of transition between the crest of the thread and the bevel or groove, a significant feature being that through such rolling process, correctly set and controlled, said raised edges of the frontal area are produced. The direction of rolling should correspond to the direction of turning in of the bushing if it is desired to use the steeper or more pronouncedly curved three-forming element (the frontal areas) for the creation of the internal thread within the smooth bore of the work piece; if it is desired, in case of special circumstances, to employ the lesser curved frontal areas as the thread-forming areas, the opposite rolling direction will be chosen. As ready mentioned, in the latter case the restoring moment is thus increased still further.

The ratio between the internal thread forming by cutting and by shaping without cutting will vary, depending for example on the steepness or height of the frontal area curvature, the sharpness of the edges of the frontal area, and other characteristics. In any event, the invention will have the effect of attaining a sufficient deformation of material without cutting, following, timewise, the cutting phase of the thread-forming process, so that compacting of the material as well as an improvement in the fiber structure of the material of the work piece can be attained. Such deformation of the material has the additional advantage that the inserted threaded bushing will be seated more strongly and securely in the work piece.

If the edges of the frontal areas are not especially sharp, as can be definitely accomplished by means of a properly controlled rolling process, any danger of separating the fibers of the work piece material will be eliminated.

BRIEF DESCRIPTION OF THE DRAWINGS

Specifically, the drawings illustrate:

In FIG. 1, the profile of a solid rod with three uniformly-spaced bevels in longitudinal direction;

In FIG. 2, a solid rod in profile with slightly convex bevels running in a longitudinal direction;

In FIG. 3, a solid rod in profile with three uniformly-spaced, slightly concave bevels running in longitudinal direction;

In FIG. 4, a plan view of a completed threaded bushing;

In FIG. 5, a plan view of another species of a completed bushing;

DETAILED DESCRIPTION OF THE ILLUSTRATED EMBODIMENTS

Figure 6:
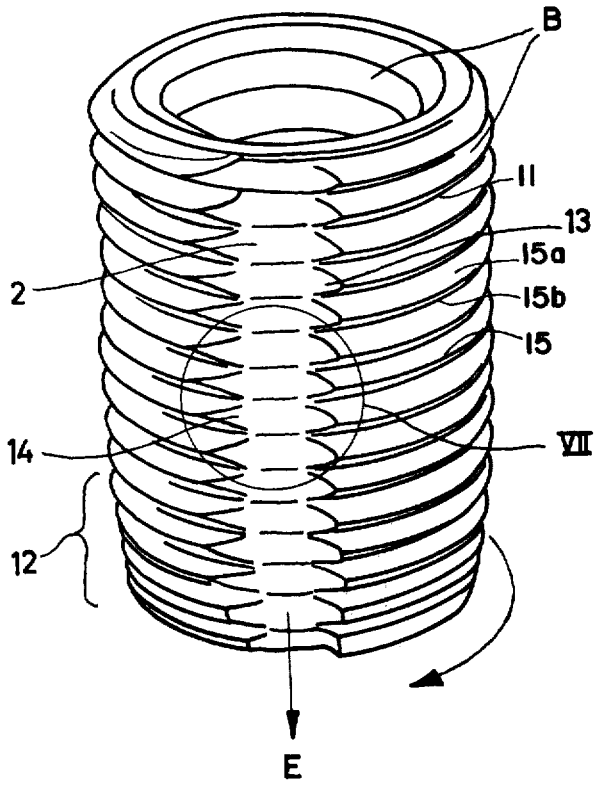
In FIG. 6, a completed threaded bushing in perspective.

FIG. 1 shows rod 1, originally a round bar, provided with flat bevels 2, spaced uniformly at the contour and running axially parallel, that is, in a longitudinal direction of the rod.

FIG. 2 shows a substantially identical rod 1', its bevels 2' shaped slightly in convex form, but otherwise identical with bevels 2.

In FIG. 3 the bevels 2'' are shaped concavely at the otherwise identical rod 1'', running again in longitudinal direction, axially parallel. At area 3 it is indicated that the rod can be hollowed, whereby the inner wall 3 can be provided with the required internal thread at the proper stage of the manufacturing process. Usually, solid rods will be preferable in view of the rolling process because there exists the danger that a thin-walled tube could be deformed excessively due to the rolling pressure.

FIG. 4 shows a completed threaded bushing B in plan view, where the direction of turning is identical with the direction of rolling, both running in clockwise direction. The rolling direction illustrated, creating the male thread, causes the above-discussed bulging, that is, the formation of curved-up or bent-up cutting edges 13, created by clockwise displacement of material. The rolling process also has the peculiar consequence that there will rise in the other direction, that is, opposite to the rolling direction, a less pronounced curvature at 14, which in this case represents the restoring edge.

In case of the threaded bushing B', shown in FIG. 5 in the form of an axial view, the rolling had been performed in opposite direction, and this figure illustrates that the position of the edges or frontal areas 13 and 14 becomes reversed, the areas being designated by numerals 13' and 14'.

FIG. 6 shows the tapering of the lower threads within area 12, a feature which is known per se and which can be accomplished for example by proper turning or grinding.

We wish to mention that the preferred basic material is a rod, manufactured by drawing and formed as shown in FIGS. 1–3. A significant feature of the invention is the fact that the frontal areas 13 as well as the opposite areas 14, created at the intersections between the bevels 2, the flanks 15a and 15b and the crests 15 of each thread at the zone of transition toward the bevel 2 or the like, have a concave shape, similar to a spoon, for example, an internal surface in the form of a spade or scoop; in other words, areas are curved inwards spherically and cup-like. Also, the roots 11 between successive threads are essentially discontinuous at bevel 2.

Figure 7:
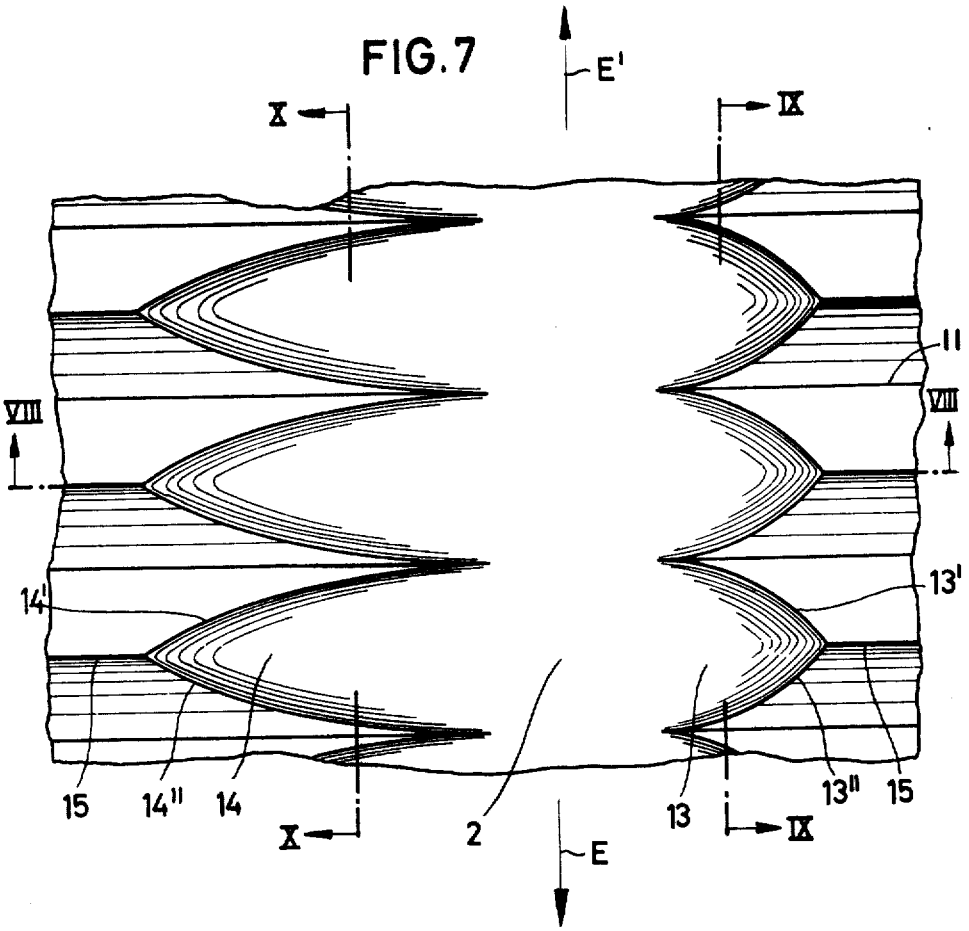
In FIG. 7, an enlargement of the area VII depicted in FIG. 6.
Figure 8:
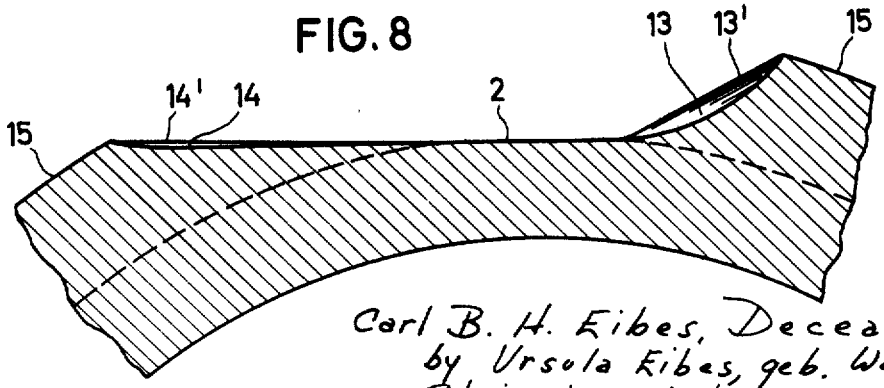
In FIG. 8, a section along line VIII—VIII of FIG. 7.

FIGS. 7 and 8 illustrate these points in a particularly clear manner. The frontal areas 13 possess a spherical concavity of the frontal edge or area of the crest 15 of the thread. The frontal areas 14 are shaped in the same manner although less pronouncedly. The edges 13' and 13'' of said frontal areas 13 are formed at the intersection of flanks 15a and 15b with bevel 2 and are upwardly forced, narrow crests which act in a certain manner as cutting edges, that is, metal-removing edges; however, since they do not possess the sharpness of a knife, they will fulfill the desired effect of not only removing metal by cutting but to begin, and at least carry out partially, the process of deforming material during the formation of the female thread within the work piece. Likewise, the edges or rims 14' and 14'' of the frontal areas 14 will form not too sharp cutting edges, so that these frontal areas 14 will increase significantly the restoring moment during the back-out, assuming that the direction of entry and turning corresponds to the arrow E in FIG. 7. Obviously, in case of the opposite direction of turning, as indicated by arrow E', the frontal area 14 will be the area forming the female thread, and areas 13 the back-out areas, causing a particularly great increase in the restoring moment.

Figure 9:
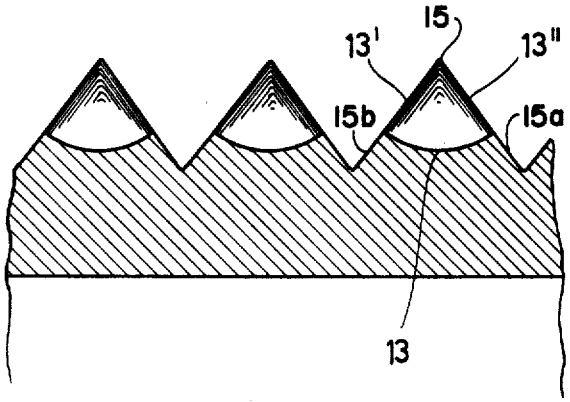
In FIG. 9, a section along line IX—IX of FIG. 7.
Figure 10:
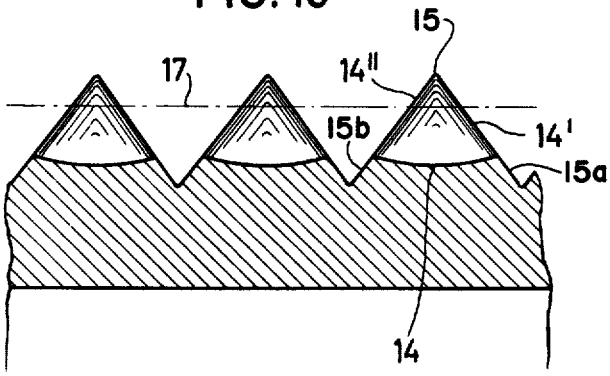
In FIG. 10, a section along line X—X of FIG. 7.

FIGS. 9 and 10 illustrate the sectional views along the lines depicted in FIG. 7. It should be noted that within the lower region 12 (see FIG. 6), the crests of the thread are flattened, that is, designed in tapered shape, as indicated by the broken line 17 in FIG. 10 (note shown in FIG. 9).

Figure 11:
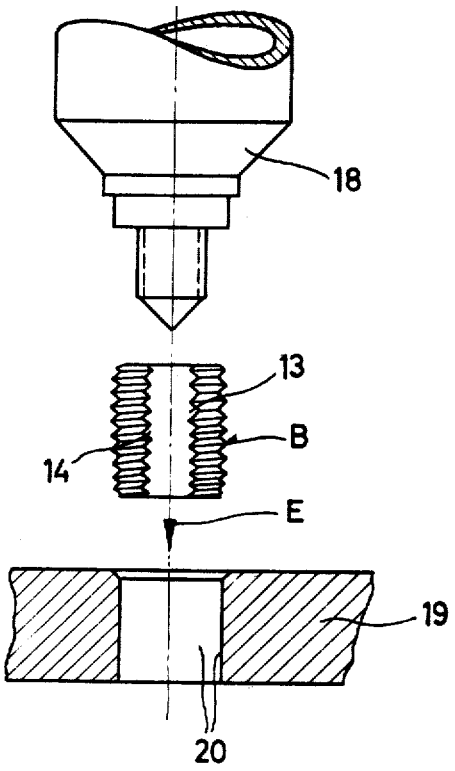
In FIG. 11, the insertion and turning process of a bushing into a work piece.

FIG. 11 shows how a threaded bushing B is introduced and turned in work piece 19 in direction E by a turning tool 18 of known construction, the work piece possessing a known smooth bore 20, the bore diameter being smaller than the widest part of the outer diameter of bushing B. The bushing B, illustrated in FIG. 11, has for example the thread-forming frontal areas 13 and the back-out areas 14, as shown in FIG. 6.

According to a preferred embodiment, the bushings of the present invention are made from a length of rod of basic circular cross section which has been provided with longitudinal planar bevels generally as shown, for example, in FIG. 1. As shown in FIGS. 4, 5, 7, and 8, the longitudinal planar bevels are located on chords of the basic circular cross section of the rod which are at a depth within the circular cross section sufficient to ensure that subsequent thread-rolling on the circular cross section does not produce any threads whose roots extend completely across the bevelled portions. In other words, the thread root radius is chosen to be at least as large as the minimum radius between the center of the circular cross section and the planar bevel. Thread rolling is properly carried out by the well-known means of three rollers spaced circumferentially about the rod, and preferably the direction of thread rolling is clockwise, that is, in the direction of turning of the bushing into the work piece. The thread rolling rollers are adjusted as required by the particular thread geometry and the rod material so that the conventional thread rolling surfaces do not roll any thread roots completely across the area in which the planar bevels are located on the rod, in a manner that will be appreciated by those skilled in the thread-rolling art. After the threads have been rolled onto the rod, the then-threaded rod is cut into a plurality of pieces each of which comprises a single bushing.

Also covered by the invention is the manufacture of threaded bushings possessing one or more of the above discussed features in that manner that first pieces of bushing length are cut off from a rod or tube section possessing a round contour, the pieces are then provided with bevels (2,2') and with a male thread by rolling, the internal thread being created in usual manner.

Finally, another manufacturing process within the framework of the invention could utilize pressure die casting with the pressure die casting tools or molds being shaped and designed in such manner that the above-discussed physical features, in particular the scoop-shaped form of the frontal areas 13, 14, will be created.

Having described an improved self-tapping bushing as one improvement of this invention, we desire it to be understood that various other modifications and alterations may be made departing the specific forms shown without departing from the scope of the invention.

What we claim is:

1. A threaded self-tapping bushing adapted to be secured to a work piece and comprising, an elongate member having helical male threads extending over at least a portion of its axial length, said threads having crests, roots between said crests, and flanks extending from said crests to said roots on either side of said crests;

said member having at least one axially extending bevel intersecting a plurality of successive threads, the crests and flanks of each said male thread at their intersection with said bevel defining frontal areas on either side of said bevel which are concave both along the circumferential direction of each said male thread and transversely thereto along the axial direction of the bushing, each said bevel being approximately as deep as the roots between the crests to ensure that the roots between successive crests are essentially discontinuous at each beveled portion, each said frontal area providing cutting edges along at least a part of its periphery as defined by said crest, flanks, and bevel, one of the two said frontal areas formed at the junction of each said male thread with said bevel having a greater curvature than the other.

2. The threaded bushing of claim 1 in which the leading frontal area in the direction of turning said bushing into said work piece has less curvature than the lagging frontal area.

3. The threaded bushing of claim 1 in which the beveled male thread profiles at least one end of the bushing are conically tapered inwardly.

* * * * *

UNITED STATES PATENT AND TRADEMARK OFFICE

CERTIFICATE OF CORRECTION

PATENT NO. : Re. 28,907

DATED : Reissued July 20, 1976

INVENTOR(S) : Carl B.H. Eibes et al.

It is certified that error appears in the above-identified patent and that said Letters Patent are hereby corrected as shown below:

In the section of Inventors, change the spelling of "Schnalttenback" to --Schnaittenback--; change the spelling of "Klopferweb" to --Klopferweg--

Signed and Sealed this

Fourth Day of January 1977

[SEAL]

*Attest:*

RUTH C. MASON
*Attesting Officer*

C. MARSHALL DANN
*Commissioner of Patents and Trademarks*